United States Patent
Song et al.

(10) Patent No.: US 6,954,207 B2
(45) Date of Patent: Oct. 11, 2005

(54) METHOD AND APPARATUS FOR PROCESSING PIXELS BASED ON SEGMENTS

(76) Inventors: Byung-cheol Song, 405-1104 Cheongmyung. Maeul Jugong 4 danji Apt., 1048-2 Youtong-dong, Paldal-gu, Suwon-si, Gyeonggi-do (KR), 442-738; Kang-wook Chun, 106-502 Shinyoungtong Hyundai Apt., 865-1 Banwol-ri, Taean eup, Hwaseong-gun, Gyeonggi-do (KR), 455-973; Jung-won Lee, 108-405 Bonereu Village, Gojan 1-dong, Ansan-si, Gyeonggi-do (KR), 425-021

( * ) Notice: Subject to any disclaimer, the term of this patent is extended or adjusted under 35 U.S.C. 154(b) by 0 days.

(21) Appl. No.: 10/718,572

(22) Filed: Nov. 24, 2003

(65) Prior Publication Data

US 2004/0160452 A1 Aug. 19, 2004

(30) Foreign Application Priority Data

Feb. 18, 2003 (KR) ................................ 10-2003-0010044

(51) Int. Cl.⁷ .............................................. G06F 13/00
(52) U.S. Cl. ....................................... 345/536; 345/560
(58) Field of Search ................................. 345/501, 536, 345/560, 530, 544, 568, 569; 382/182, 216

(56) References Cited

U.S. PATENT DOCUMENTS

| | | | |
|---|---|---|---|
| 6,072,507 A | * 6/2000 | Balatsos et al. | ............. 345/569 |
| 6,215,507 B1 | * 4/2001 | Nally et al. | ................. 345/568 |
| 6,563,951 B2 | * 5/2003 | Fåhraeus et al. | ............ 382/216 |
| 2003/0086610 A1 | * 5/2003 | Luo et al. | .................... 382/182 |

* cited by examiner

Primary Examiner—Kee M. Tung
(74) Attorney, Agent, or Firm—Sughrue Mion, PLLC

(57) ABSTRACT

There is provided a segment-based pixel processing apparatus and method for effective use of memory. The method includes dividing pixel data within a frame into a plurality of segments in the vertical direction; sequentially pre-processing or post-processing pixel data in a segment among the plurality of segments in line units, and then, sequentially pre-processing or post-processing pixel data in a next segment in line units; and repeating pre-processing or post-processing on pixel data in the other segments in line units until reaching a segment of a predetermined number.

12 Claims, 4 Drawing Sheets

METHOD AND APPARATUS FOR PROCESSING PIXELS BASED ON SEGMENTS

This application claims the priority of Korean Patent Application No. 2003-10044 on 18 Feb. 2003, in the Korean Intellectual Property Office, the disclosure of which is incorporated herein in its entirety by reference.

BACKGROUND OF THE INVENTION

1. Field of the Invention

The present invention relates to a memory operating system for encoding and decoding data, and particularly, to a segment-based pixel processing apparatus and a method for effective memory operation.

2. Description of the Related Art

In general, pre-processing or post-processing is performed on an encoded or decoded image signal in order to improve the quality of an image. Here, the pre-processing or post-processing is performed in pixel units.

Referring to FIG. 1, input pixel data is temporarily stored in a frame memory (not shown) in frames units or field units. The pixel data stored in frame or field units is read by a memory for processing. As illustrated in FIG. 1, in general, the pixel data is pre-processed or post-processed through several line memories, starting from the uppermost line of the frame to its lowermost line from left to right. That is, pixel data within a frame is sequentially pre-processed or post-processed in the sequence of row #0→row #1→row #2→row #3→row #4, . . . , etc.

Referring to FIG. 2, let us assume that the neighbor pixels at $n-1^{th}$ and $n+1^{th}$ rows necessary for pre-processing or post-processing a pixel at an $n^{th}$ row are present right above and under the pixel at the $n^{th}$ row. The pixels at the $n-1^{th}$, $n^{th}$, and $n+1^{th}$ rows are input to a processor 240 via a first line memory 210, a second line memory 220, and a third line memory 230, respectively.

For instance, assuming that an image signal having 720 pixels×480 lines is present within a frame, a conventional hardware structure for performing low-pass filtering on 3 pixels×3 pixels requires three line memories capable of storing at least 720 pixels. That is, the conventional hardware structure requires line memory of about 2.2 Kbytes.

Accordingly, as more frames are required to be processed and the number of pixels above and under each target pixel increases, a conventional pixel processing method requires more line memory to perform pre-processing or post-processing on the increased number of pixels.

SUMMARY OF THE INVENTION

The present invention provides a segment-based pixel processing method and apparatus in which a frame is divided into several segments and image processing is performed in segment units, thereby reducing loads on memory.

According to an aspect of the present invention, there is provided a pixel processing apparatus including a frame storage unit in which input pixel data is stored in frame/field units; a line storage unit in which the pixel data, which is stored in the frame storage unit in frame/field units, is stored in line units per vertically-divided segment; a processor that pre-processes or post-processes on the pixel data stored in the line storage unit; and a controller that divides the pixel data within a frame, which is stored in the frame storage unit, into a plurality of segments in the vertical direction, and sequentially stores the pixel data in the line storage unit in the sequence of segments in line units.

According to another aspect of the present invention, there is provided a pixel processing method including dividing pixel data within a frame into a plurality of segments in the vertical direction; sequentially pre-processing or post-processing pixel data in a segment among the plurality of segments in line units, and then, sequentially pre-processing or post-processing pixel data in a next segment in line units; and repeating pre-processing or post-processing on pixel data in the other segments in line units until reaching a segment of a predetermined number.

According to a yet another aspect of the present invention, there is provided a method of processing pixels in a frame that is divided into a plurality of segments, the method including storing pixel data at the first line of a $k^{th}$ segment in line units; pre-processing or post-processing the pixel data after storing the pixel data in a predetermined number of line units; separately storing the pre-processed or post-processed pixel data, and then, checking whether pre-processing or post-processing is performed on pixel data at the last row of the $k^{th}$ segment or not; checking whether the $k^{th}$ segment is a segment of a predetermined number after the pre-processing/post-processing on the pixel data at the last row; and completing segment-based pixel processing when the $k^{th}$ segment is the segment of the predetermined number, and repeating the pixel processing until reaching the segment of the predetermined number otherwise.

In another aspect of the present invention, there is provided a computer-readable recording medium for recording a computer program code for enabling a computer to provide the services of the above methods of processing pixels.

DETAILED DESCRIPTION OF THE INVENTION

Hereinafter, exemplary embodiments of the present invention will be described in detail with reference the accompanying drawings.

Figure 3:
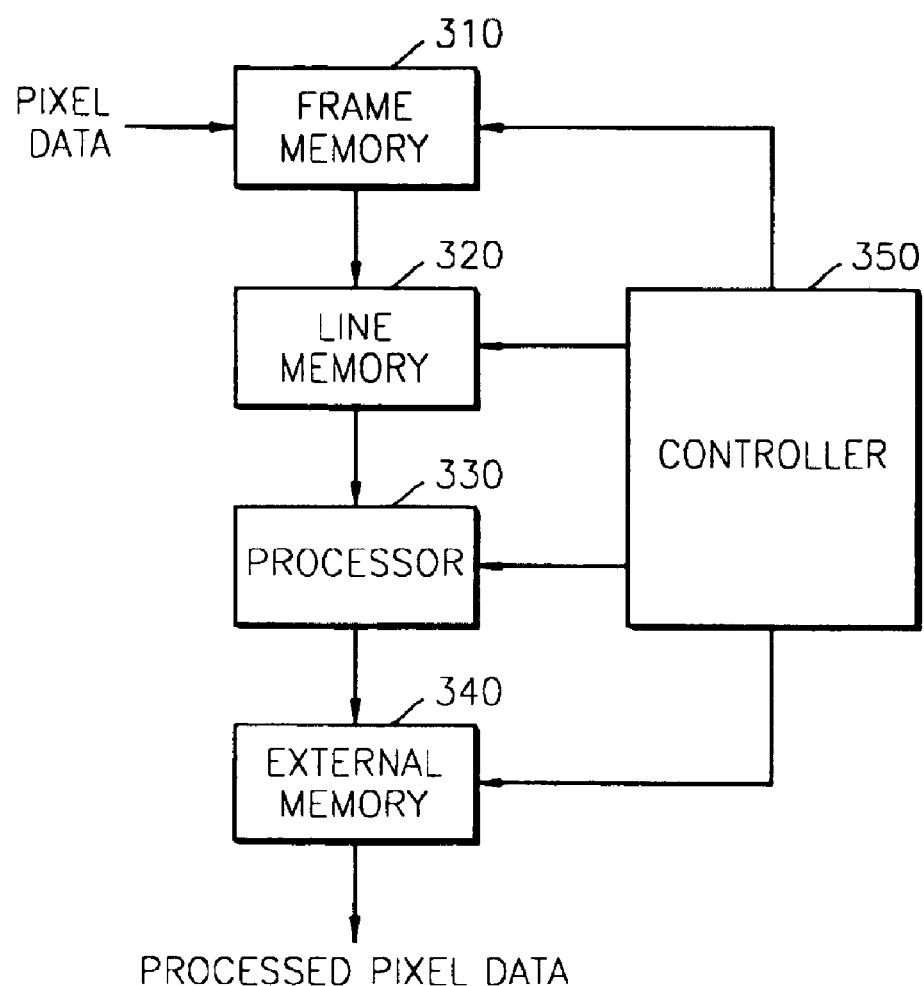
FIG. 3 is a block diagram illustrating a structure of a segment-based pixel processing apparatus according to an exemplary embodiment of the present invention.

FIG. 3 is a block diagram illustrating a structure of a segment-based pixel processing apparatus according to an exemplary embodiment of the present invention.

Referring to FIG. 3, a frame memory 310 temporarily stores input pixel data in frame/field units.

A line memory 320 stores the pixel data, which is stored in the frame memory 310 in frame/field units, in line units per segment in the vertical direction. The size of the line memory 320 is determined by dividing the length of a frame line by K (K is an integer more than 1). For instance, if a frame having 720 pixels×480 lines is divided into six segments in the vertical direction, the size of the line memory 320 is 120 pixels×480 lines. Also, if low-pass filtering is performed in units of 3 pixels×3 pixels, the number of line memory 320 required is three.

A processor 330 performs low-pass filtering, such as pre-processing or post-processing, on the pixel data that is stored in the line memory 320 in line units.

An external memory 340 stores the pixel data that is pre-processed or post-processed by the processor 330.

A controller 350 reads pixel data, within a frame, which is stored in the frame memory 310, in units of vertically-divided segments, sequentially stores the read pixel data in the line memory 320 in line units per segment, and stores the pixel data, which is pre-processed or post-processed by the processor 330, in the external memory 340.

Figure 4:
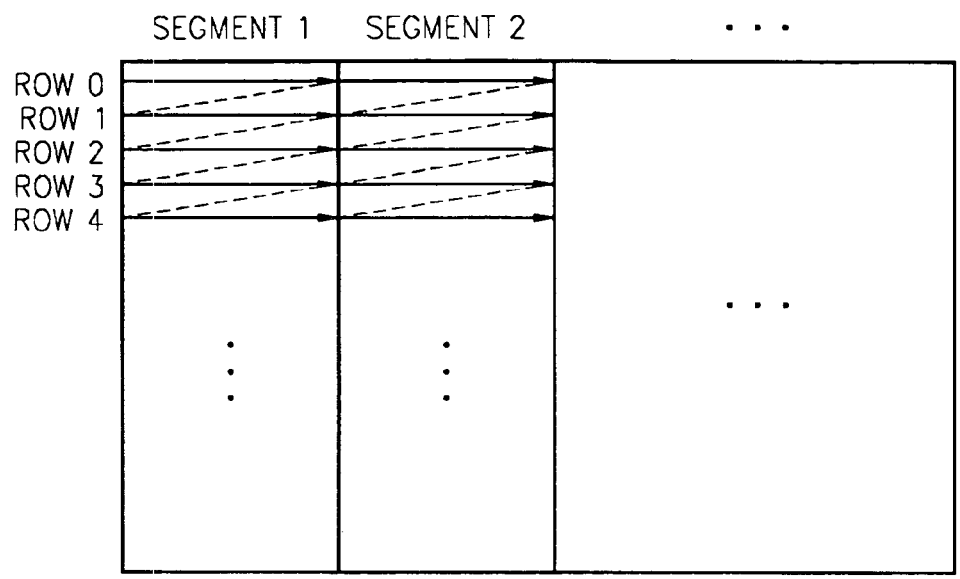
FIG. 4 illustrates a method of processing pixels within a frame, according to an exemplary embodiment of the present invention.

FIG. 4 illustrates a method of processing pixels within a frame, according to an exemplary embodiment of the present invention.

Figure 1:
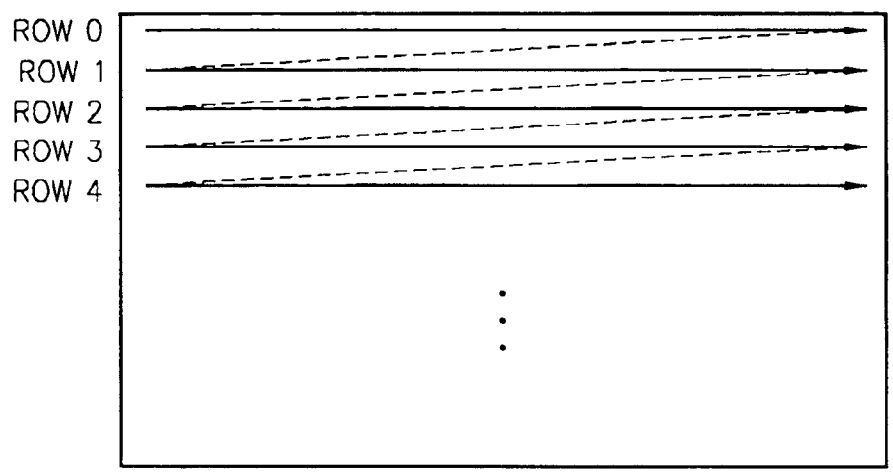
FIG. 1 illustrates a conventional method of processing pixels within a frame using a pre-processor or a post-processor.
Figure 2:
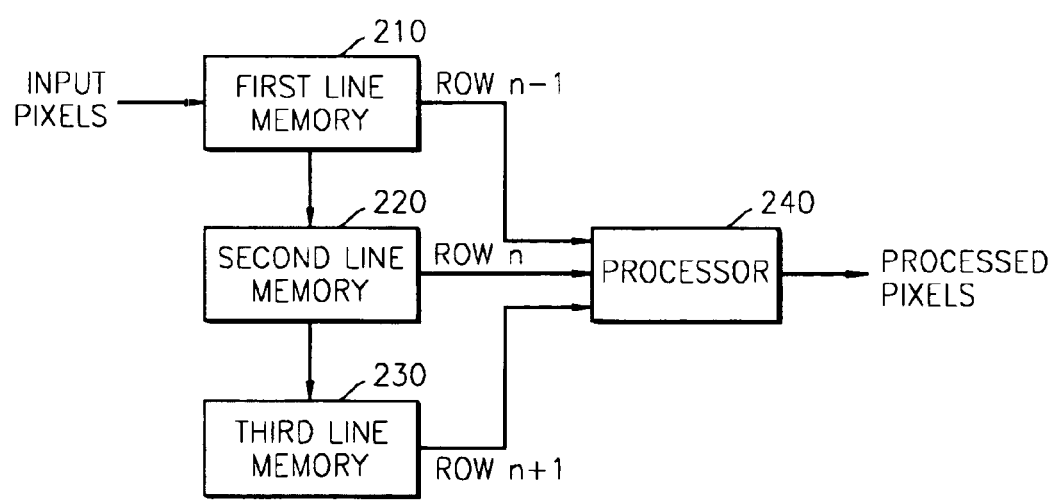
FIG. 2 is a block diagram illustrating a structure of an image signal processing apparatus performing the conventional pixel processing method of FIG. 1.

Referring to FIG. 4, a frame is divided into several segments, e.g., a first segment, a second segment, ..., etc. Pixel data in the frame is pre-processed or post-processed in the sequence of the first segment→the second segment→ . . . , etc. Also, the pixel data in each segment is sequentially pre-processed or post-processed starting from the uppermost line of the frame to the lowermost line as in the conventional pixel processing method shown in FIG. 1. For instance, the pixel data in the first segment is processed in the sequence of pixel data at row #0→pixel data at row #1→pixel data at row #2→pixel data at row #3→pixel data at row #4, ..., etc. Further, the pixel data at each row is pre-processed or post-processed from left to right.

Accordingly, a pixel processing method according to the present invention can be performed with a line memory of remarkably reduced size. If low-pass filtering is performed on an image signal having 720 pixels×480 lines in units of 3 pixels×3 pixels, a conventional pixel processing method requires line memory of at least 2.1 Kbytes. However, assuming that the number of pixels at a line within a segment is 120, the size of line memory required in the pixel processing method according to the present invention can be reduced to one sixth, i.e., 360 bytes, of the size of line memory required in the conventional pixel processing method.

Figure 5:
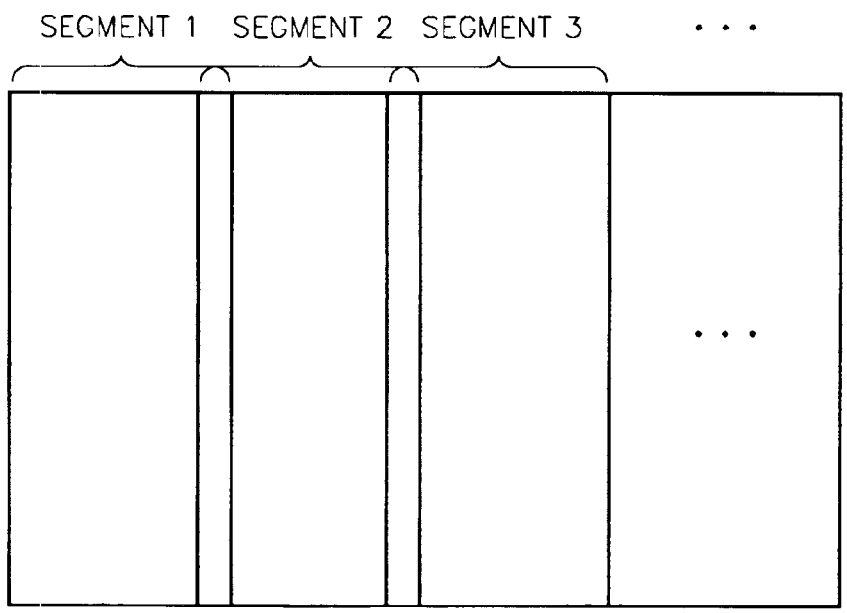
FIG. 5 illustrates a method of processing pixels within a frame, according to another embodiment of the present invention.

However, when the frame segments do not overlap one another as shown in FIG. 4, artifacts may occur in pixel data at borders of the segments due to insufficient pixel information during pre-processing/post-processing. To solve this problem, it is possible to divide a frame into several segments as shown in FIG. 5 such that the segments overlap one another by a predetermined number of pixels. FIG. 5 illustrates a method of processing pixels within a frame, according to another embodiment of the present invention. In this case, although the size of the memory increases slightly, it is possible to prevent artifacts from occurring at the borders of the segments.

Figure 6:
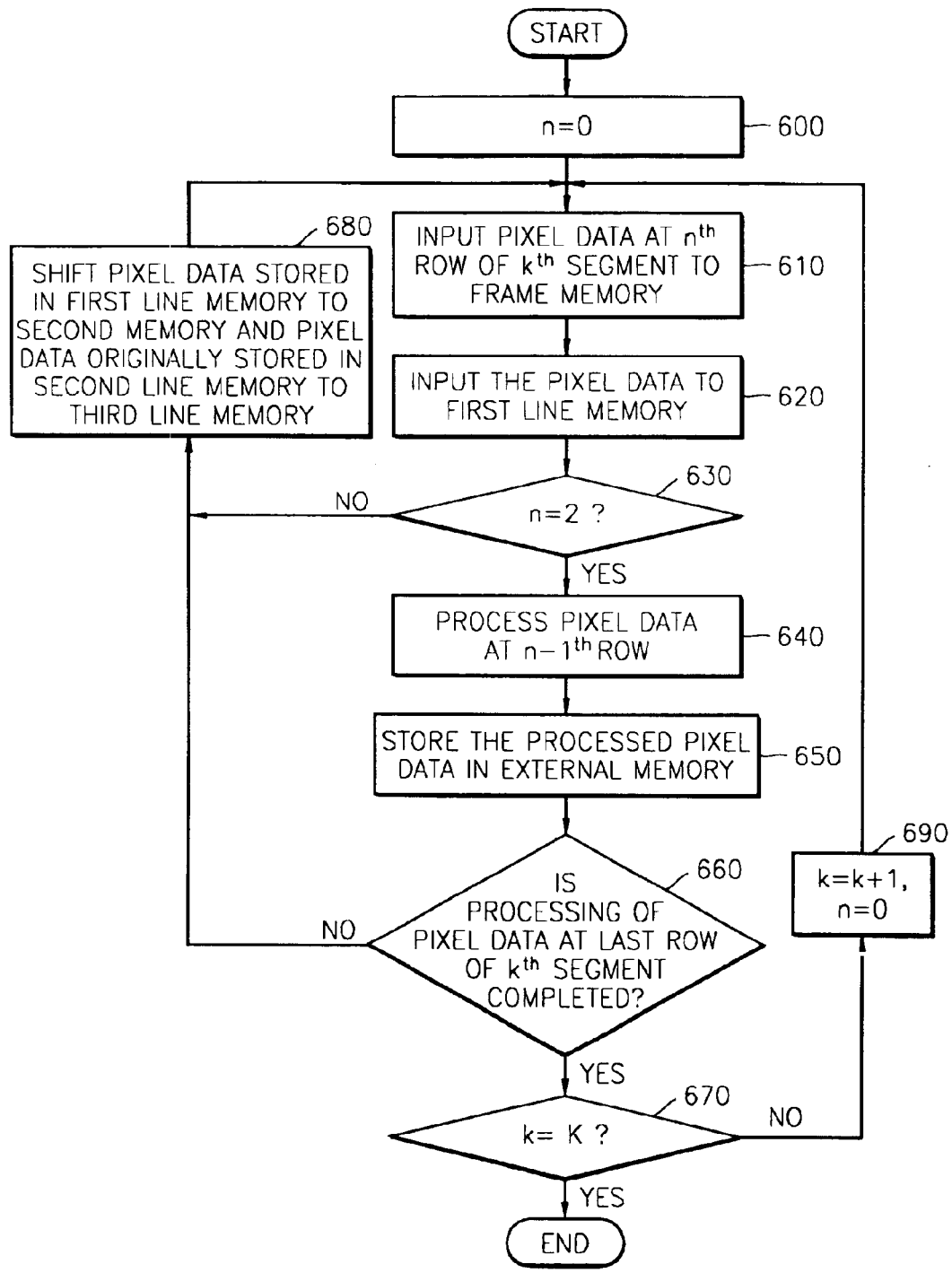
FIG. 6 is a flowchart illustrating a method of processing pixels within a frame that is divided into a plurality of segments, according to an exemplary embodiment of the present invention.

FIG. 6 is a flowchart illustrating a method of processing pixels within a frame that is divided into a plurality of segments, according to an exemplary embodiment of the present invention.

First, let us assume that the pixel data within a frame or field is divided into a plurality of segments in the vertical direction and then, low-pass filtering is performed on the pixel data in units of 3 pixels×3 pixels. In this case, first through third line memories capable of storing three line data are required. Also, let us assume that the pixel at the uppermost and lowermost lines of the frame will not be processed for convenience.

Referring to FIG. 6, a total number of rows n is initialized to 0 in action 600.

In action 610, pixel data at an $n^{th}$ row of a $k^{th}$ segment is input to the frame memory.

In action 620, the pixel data at the $n^{th}$ row is input to a first line memory.

In action 630, it is checked whether pixel data is stored in all of the three line memories in line units. For instance, it is checked whether n of the $n^{th}$ row is 2. In action 680, if n is not determined to be 2 in action 630, the pixel data stored in the three line memories is shifted to their next memories, respectively. That is, the pixel data stored in the first line memory is shifted to the second line memory and the pixel data originally stored in the second line memory is shifted to the third line memory.

In action 640, if n of the $n^{th}$ row is determined to be 2 in action 630, low-pass filtering, such as pre-processing or post-processing, is performed on the pixel data at the $n-1^{th}$ row.

In action 650, the pre-processed or post-processed pixel data is stored in an external memory.

In action 660, it is checked whether pixel data stored at the last row of a $k^{th}$ segment was pre-processed/post-processed. If it is determined in action 660 that pixel data stored at the last row of a $k^{th}$ segment is not pre-processed or post-processed, the pixel processing method returns to action 680 and actions 680 and 610 through 660 are performed again on pixel data at a next row of the $k^{th}$ segment.

In action 670, if it is determined in action 660 that pixel data stored at the last row was pre-processed or post-processed, it is checked whether the $k^{th}$ segment corresponds to the last segment K of the frame or not (K is an integer more than 1).

If it is determined in action 670 that the $k^{th}$ segment corresponds to the last segment K, pixel processing in segment units is completed. However, if the $k^{th}$ segment does not correspond to the last segment K, the pixel processing method returns to action 610 and pixel processing is performed on pixel data at a $k+1^{th}$ segment again. In this way, pre-processing or post-processing is sequentially performed in segment units.

In conclusion, a frame is divided into segments of a predetermined number and then, pixel data within the frame is sequentially pre-processed or post-processed in the sequence of a first segment, a second segment, ..., etc.

While this invention has been particularly shown and described with reference to exemplary embodiments thereof, it will be understood by those skilled in the art that various changes in form and details may be made therein without departing from the spirit and scope of the invention as defined by the appended claims.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD-ROM), a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

As described above, in a pixel processing apparatus and method according to the present invention, a frame is divided into several segments and pixels within the frame are processed in segment units using a pre-processor or a post-processor, thereby remarkably reducing loads on memory.

What is claimed is:

1. A pixel processing apparatus, comprising:
   a frame storage unit in which input pixel data is stored in frame/field units;
   a line storage unit in which the input pixel data, which is stored in the frame storage unit in frame/field units, is stored in line units per vertically-divided segment;
   a processor that pre-processes or post-processes the input pixel data stored in the line storage unit; and
   a controller that divides the input pixel data within a frame, which is stored in the frame storage unit, into a plurality of segments in a vertical direction, and sequentially stores the input pixel data in the line storage unit in a sequence of segments in line units.

2. The apparatus of claim 1, wherein a size of the line storage unit is determined by dividing a line length of a frame by K, wherein K is an integer greater than 1.

3. The apparatus of claim 1, wherein the controller sequentially stores input pixel data in a segment among the plurality of segments in the line storage unit in line units, sequentially stores input pixel data in a next segment in the line storage unit in line units, and repeats storing of pixel data in other segments until reaching a segment of a predetermined number.

4. A pixel processing method comprising:
   dividing pixel data within a frame into a plurality of segments in a vertical direction;
   sequentially pre-processing or post-processing the pixel data in a segment among the plurality of segments in line units and then, sequentially pre-processing or post-processing the pixel data in a next segment in line units; and
   repeating pre-processing or post-processing on the pixel data in other segments in line units until reaching a segment of a predetermined number,
   wherein the sequentially pre-processing or post-processing the pixel data in the segment comprises storing the pre-processed or the post-processed pixel data and checking whether or not pre-processing or post-processing is performed on pixel data at a last row of the segment.

5. The method of claim 4, wherein each of the plurality of segments within the frame overlaps another of the plurality of segments by a predetermined number of pixels.

6. The method of claim 4, wherein the sequentially pre-processing or post-processing the pixel data in the segment further comprises checking whether the segment is the segment of the predetermined number after the pre-processing/post-processing on pixel data at a last row of the segment.

7. The method of claim 6 further comprising completing segment-based pixel processing when the segment is the segment of the predetermined number, and repeating the pixel processing until reaching the segment of the predetermined number when the segment is not the segment of the predetermined number.

8. A method of processing pixels in a frame that is divided into a plurality of segments, the method comprising:
   storing pixel data at a first line of a $k^{th}$ segment in line units;
   pre-processing or post-processing the pixel data after storing the pixel data in a predetermined number of line units and outputting corresponding pre-processed or post-processed pixel data;
   separately storing the pre-processed or post-processed pixel data and then, checking whether pre-processing/post-processing is performed on the pixel data at a last row of the $k^{th}$ segment or not;
   checking whether the $k^{th}$ segment is a segment of a predetermined number after the pre-processing/post-processing on the pixel data at the last row; and
   completing segment-based pixel processing when the $k^{th}$ segment is the segment of the predetermined number, and repeating the pixel processing until reaching the segment of the predetermined number when the $k^{th}$ segment is not the segment of the predetermined number.

9. A computer-readable recording medium for recording a computer program code for enabling a computer to provide a service of processing pixels, the service comprising the steps of:
   dividing pixel data within a frame into a plurality of segments in a vertical direction;
   sequentially pre-processing or post-processing the pixel data in a segment among the plurality of segments in line units and then, sequentially pre-processing or post-processing the pixel data in a next segment in line units; and
   repeating pre-processing or post-processing on the pixel data in other segments in line units until reaching a segment of a predetermined numbers,
   wherein the sequentially pre-processing or post-processing the pixel data in the segment comprises storing the pre-processed or the post-processed pixel data and checking whether or not pre-processing or post-processing is performed on pixel data at a last row of the segment.

10. The computer-readable recording medium of claim 9, wherein each of the plurality of segments within the frame overlaps another of the plurality of segments by a predetermined number of pixels.

11. A computer-readable recording medium for recording a computer program code for enabling a computer to provide a service of processing pixels, the service comprising the steps of:
   storing pixel data at a first line of a $k^{th}$ segment in line units;
   pre-processing or post-processing the pixel data after storing the pixel data in a predetermined number of line units and outputting corresponding pre-processed or post-processed pixel data;
   separately storing the pre-processed or post-processed pixel data and then, checking whether pre-processing/post-processing is performed on the pixel data at a last row of the $k^{th}$ segment or not;
   checking whether the $k^{th}$ segment is a segment of a predetermined number after the pre-processing/post-processing on the pixel data at the last row; and
   completing segment-based pixel processing when the $k^{th}$ segment is the segment of the predetermined number, and repeating the pixel processing until reaching the segment of the predetermined number when the k$^{th}$ segment is not the segment of the predetermined number.

12. A pixel processing method comprising:

dividing pixel data within a frame into a plurality of segments in a vertical direction;

sequentially pre-processing or post-processing the pixel data in a segment among the plurality of segments in line units, comprising:

shifting n row pixel data of the segment stored in a first memory to a second memory;

shifting n+1 row pixel data of the segment stored the second memory to a third memory; and storing n+2 row pixel data of the segment in the first memory;

sequentially pre-processing or post-processing the pixel data in a next segment in line units; and repeating pre-processing or post-processing on the pixel data in other segments in line units until reaching a segment of a predetermined number.

\* \* \* \* \*